(12) United States Patent
Sheng et al.

(10) Patent No.: US 7,158,270 B2
(45) Date of Patent: Jan. 2, 2007

(54) SCANNING MODULE

(75) Inventors: Thomas Sheng, Hsin Chu (TW); Hyman Hsiao, Miao Li (TW)

(73) Assignee: Avision Inc., Hsinchu (TW)

( * ) Notice: Subject to any disclaimer, the term of this patent is extended or adjusted under 35 U.S.C. 154(b) by 897 days.

(21) Appl. No.: 10/265,486

(22) Filed: Oct. 7, 2002

(65) Prior Publication Data

US 2003/0169463 A1 Sep. 11, 2003

(30) Foreign Application Priority Data

Mar. 8, 2002 (TW) ............................... 91202761 U (51) Int. Cl.
*H04N 1/04* (2006.01)

(52) U.S. Cl. ...................... 358/497; 358/474

(58) Field of Classification Search ................ 358/497, 358/494, 483, 482, 474, 471, 512–514, 505, 358/506, 487; 250/208.1, 234–236, 216, 250/239; 382/312, 318, 319; 399/211, 212; 235/454

See application file for complete search history.

(56) References Cited

U.S. PATENT DOCUMENTS

| | | | | |
|---|---|---|---|---|
| 5,982,512 A | * | 11/1999 | Kim | 358/498 |
| 6,137,106 A | * | 10/2000 | Kao | 250/239 |
| 6,888,651 B1 | * | 5/2005 | Lee | 358/497 |
| 2004/0263917 A1 | * | 12/2004 | Hong et al. | 358/474 |

* cited by examiner

*Primary Examiner*—Cheukfan Lee (57) ABSTRACT

A scanning module includes a contact image sensor, a movable base and an elasticity unit that is assembled between the contact image sensor and the base. When the assembly of the contact image sensor and the elasticity unit is placed under a glass window of a scanner, the contact image sensor and elasticity unit can be moved relatively. Thus, the scanning module can be easily assembled and decided a reduced volume to satisfy the miniaturized requirement.

15 Claims, 12 Drawing Sheets

SCANNING MODULE

FIELD OF THE INVENTION

The present invention relates to a scanning module, and in particular to a scanning module used in a CIS type scanner and composed of a contact image sensor, a movable base and an elasticity unit.

BACKGROUND OF THE INVENTION

For a CIS type scanner, the assembly of a contact image sensor and a carrying base can be defined as a scanning module. Conventionally, the contact image sensor is fixed to the carrying base, and a top of the contact image sensor is engaged to an underside of a glass window. The carrying base is movable along a guide rod so as to scan and receive images during the movement of the scanning module.

U.S. Pat. No. 5,801,851 discloses an improvement of a CIS type scanning module and the contact image sensor is installed in a nest and a spring is biased between the contact image sensor and the nest. The spring urges the contact image sensor against an underside of a glass window.

In volume perspective, the nest in the above U.S. patent can receive the contact image sensor so that the volume of the contact image sensor and the nest occupy a large space.

Figure 1:
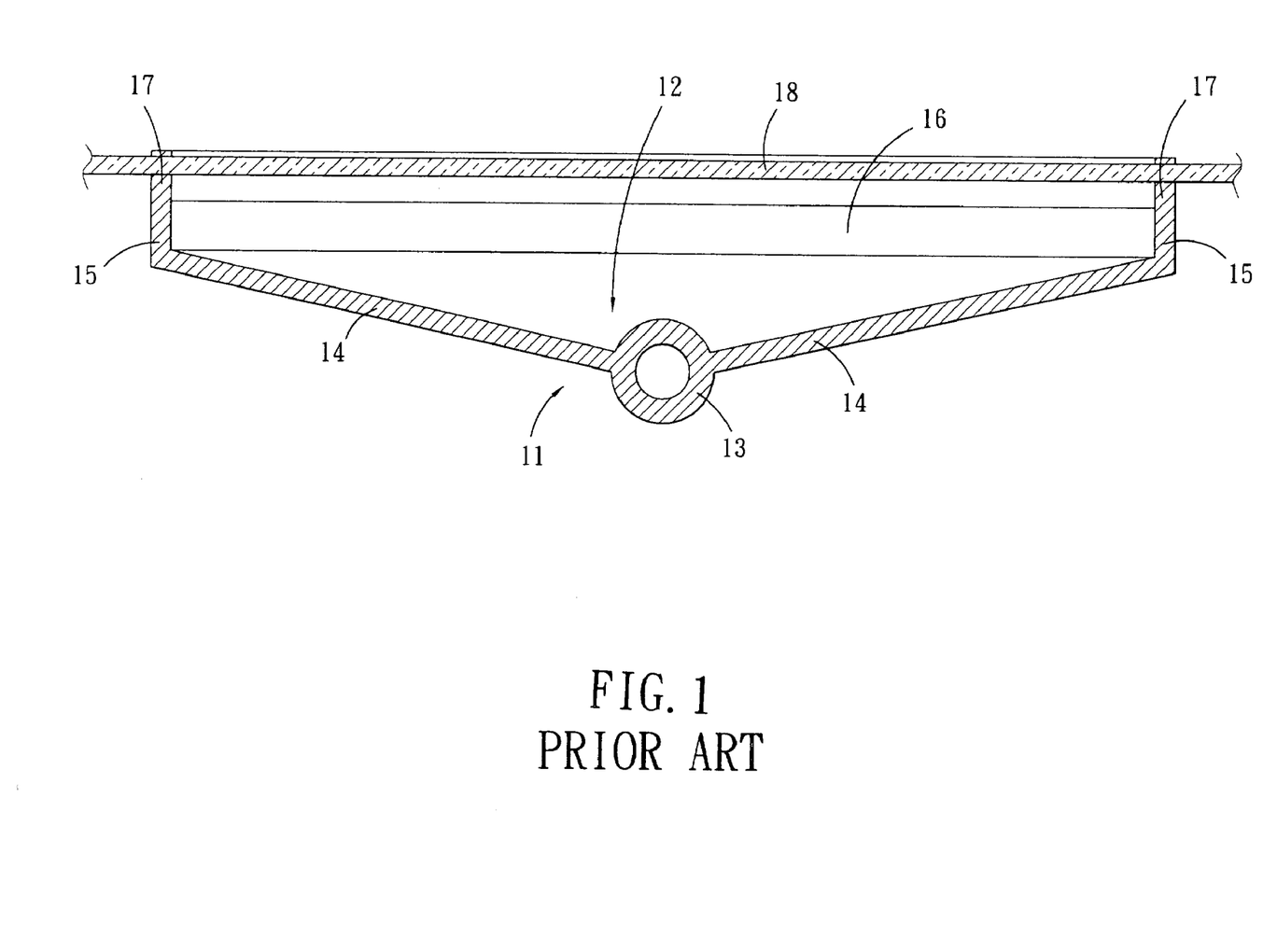
FIG. 1 shows a conventional scanning module.

FIG. 1 shows a Taiwanese Publication Patent No. 470276 which discloses a mechanism that maintains a fixed gap between the contact image sensor and the underside of the glass window. A carrying base 11 has an underside 12 which has two sleeves 13 for engaging with a guide rod (not shown). Two support portions 14 extend from two sides of the underside 12 and each of which has a flange 15 which are higher than the contact image sensor 16. A pad 17 is located on a top of each of the flanges 15.

In design perspective, because the flanges 15 of the carrying base 11 contacts the underside of the glass window 18, a downward force is applied on the carrying base 11. So, when every part of the carrying base 11 is made as a one-piece member by the same material, and the contact image sensor 16 is fixed to the carrying base 11, the flanges 15 and the carrying base 11 have complicated deformation under force and the deformation is difficult to be calculated and predicted. For the designers, they cannot calculate and choose correct features of the material to be used so that a try-and-error method is used to choose the factors. However, the method does not meet the requirements of design.

In the transmitting perspective, because the gap has to be maintained between the carrying base 11 and the glass window 18, the contact image sensor 16 has to be fixed on the carrying base 11 such that the elasticity efficient of the carrying base 11 becomes large. Therefore, when the carrying base 11 deforms slightly, a huge bounce force is generated and pushes the carrying base 11 to firmly contact the glass window 18. This increases the friction between the glass window 18 and the carrying base 11 and a larger transmit force is required. This will waste too much energy and the carrying base 11 is difficult to move.

In the perspective of getting material, the flanges 15 need a material that has low elasticity efficient so that it is easily to be deformed and the pads 17 should be made by the material that has low friction efficient so that the pads 17 may move smoothly. However, in practical situation, the pads 17 and the flanges 15 are made by the same material and there is no proper material with low price existed.

In the perspective of the whole volume, the length of the carrying base 11 is roughly the same as that of the contact image sensor 16, so that both of which occupy a large space which does not meet the miniaturized requirement of the trend of design.

Besides, if the contact image sensor 16 is not fixed on the carrying base 11, or it is positioned by force-fitted arrangement, after the carrying base 11 is deformed, it cannot firmly contact the contact image sensor 16. The contact image sensor 16 will move downward and away from the glass window 18. In this situation, the gap between the glass window 18 and the contact image sensor 16 cannot be fixed and results in poor scanning feature.

SUMMARY OF THE INVENTION

The main object of the present invention is to provide a scanning module that is composed of a base and a contact image sensor, and both of which are easily to be designed and assembled.

Another object of the present invention is to provide a scanning module that includes a base and a contact image sensor and occupies less space.

Yet another object of the present invention is to provide a scanning module wherein the gap between the base and the contact image sensor is fixed.

In order to achieve the objects mentioned above, the present invention provides an elasticity unit between the base and the contact image sensor, and the contact image sensor is engaged with the elasticity unit so that the base and the contact image sensor can be moved relatively. By this way, the contact image sensor can be easily assembled and the gap between the base and the contact image sensor can be fixed.

Furthermore, by reducing the volume of the base and extending outward the elasticity unit from the two sides of the base to contact the contact image sensor, a compact assembly is obtained.

The present invention will become more obvious from the following description when taken in connection with the accompanying drawings which show, for purposes of illustration only, preferred embodiments in accordance with the present invention.

DETAILED DESCRIPTION OF THE PREFERRED EMBODIMENTS

Figure 2:
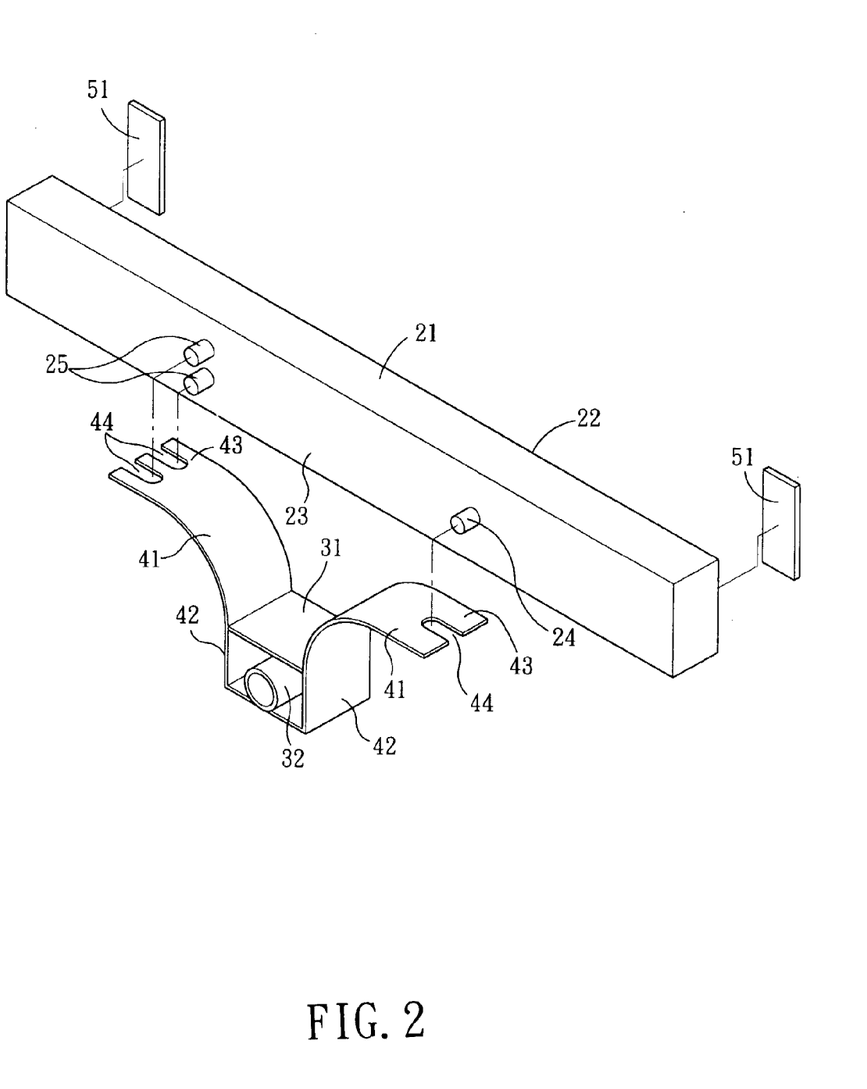
FIG. 2 is an exploded view to show the scanning module of the present invention.

FIG. 2 shows an exploded view of the present invention and discloses a contact image sensor 21, a base 31, two elasticity units 41, and two slidable units 51. For description purpose, two elasticity units 41 are used as an example. Nevertheless, the two elasticity units 41 may also be made as a single piece which does not affect the feature of the present invention.

The contact image sensor 21 has a top surface 22 and a bottom surface 23 which has protrusions 24, 25 at two ends thereof.

The base 31 has a guide portion 32 which can be a sleeve as shown.

The two elasticity units 41 are located at two opposite sides of the base 31. In particular, each elasticity unit 41 has a fixed end 42 for being fixed to the base 31, and a free end 43 which is located away from the base 31. The free ends 43 have grooves 44 defined therein and each groove 44 has an open end.

The slidable units 51 have a lower friction efficient and may be made of plates such as Teflon plates. It is to be noted that the slidable units 51 can be omitted if the contact image sensor 21 can be moved along the glass window.

The assembly of the above-mentioned parts is called a scanning module, and especially a scanning module of the CIS type scanner.

Figure 3:
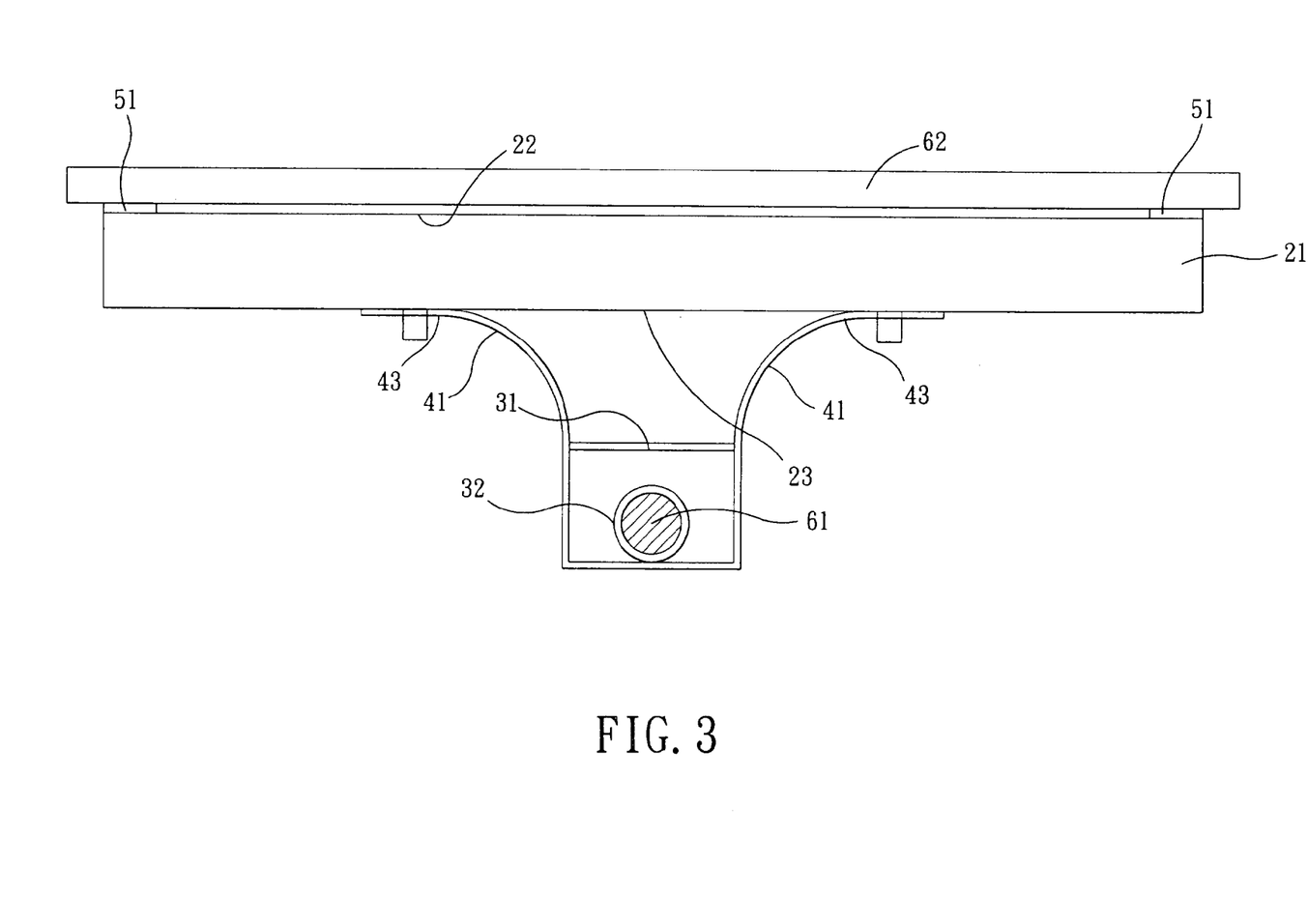
FIG. 3 shows the scanning module of the present invention.

FIG. 3 shows the assembly of the present invention. A guide rod 61 of the scanner extends in the guide portion 32 of the base 31, and the free ends 43 of the elasticity units 41 on the two sides of the base 31 are close to the glass window 62 of the scanner.

The bottom surface 23 of the contact image sensor 21 is located corresponding to the free ends 43 of the elasticity units 41, and the top surface 22 is located corresponding to the glass window 62 so that the slidable unit 51 is attached to the glass window 62.

Figure 4:
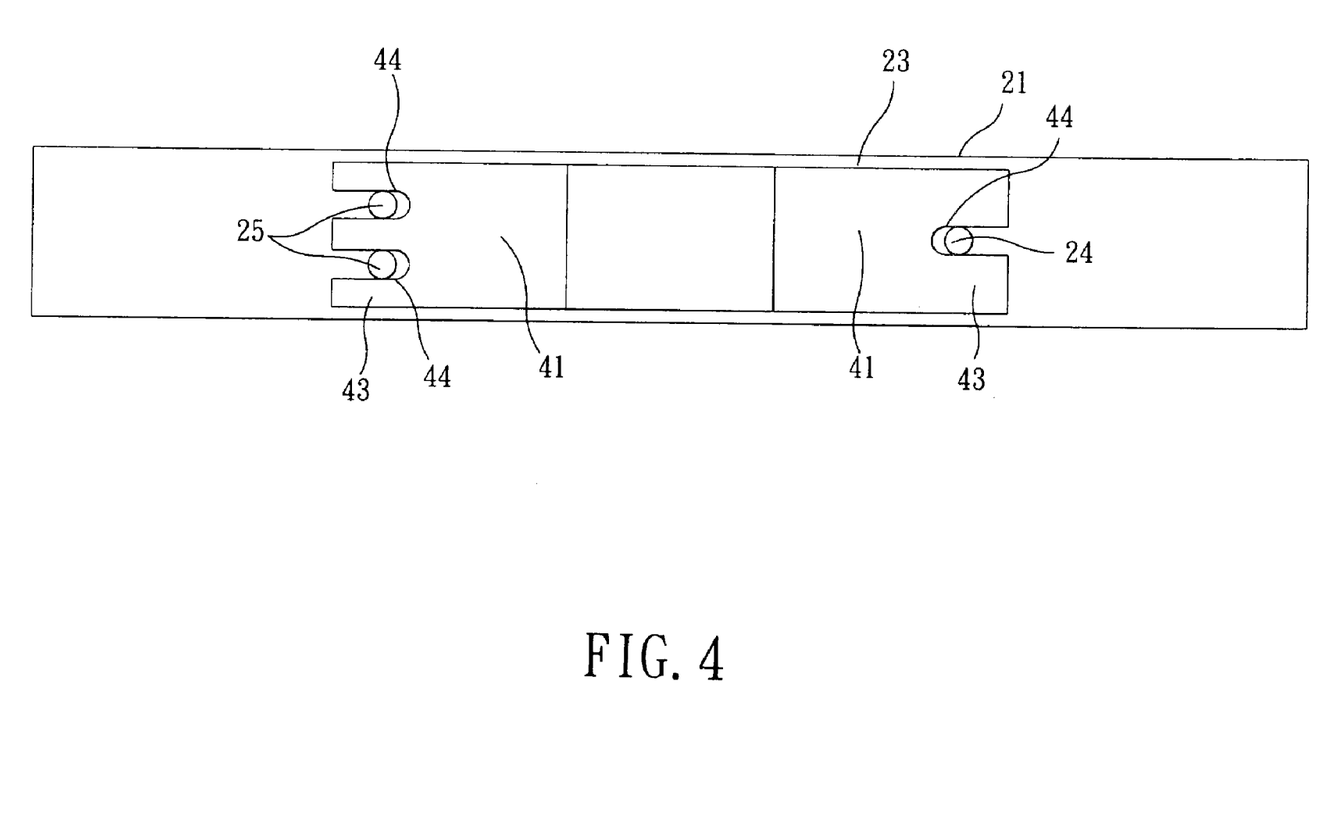
FIG. 4 shows a bottom view of the scanning module of the present invention.

FIG. 4 is a bottom view of the assembly. The contact image sensor 21 is engaged with the elasticity units 41 so that the protrusions 24, 25 of the bottom surface 23 are engaged with the grooves 44 of the free ends 43 of the elasticity units 41.

Figure 5:
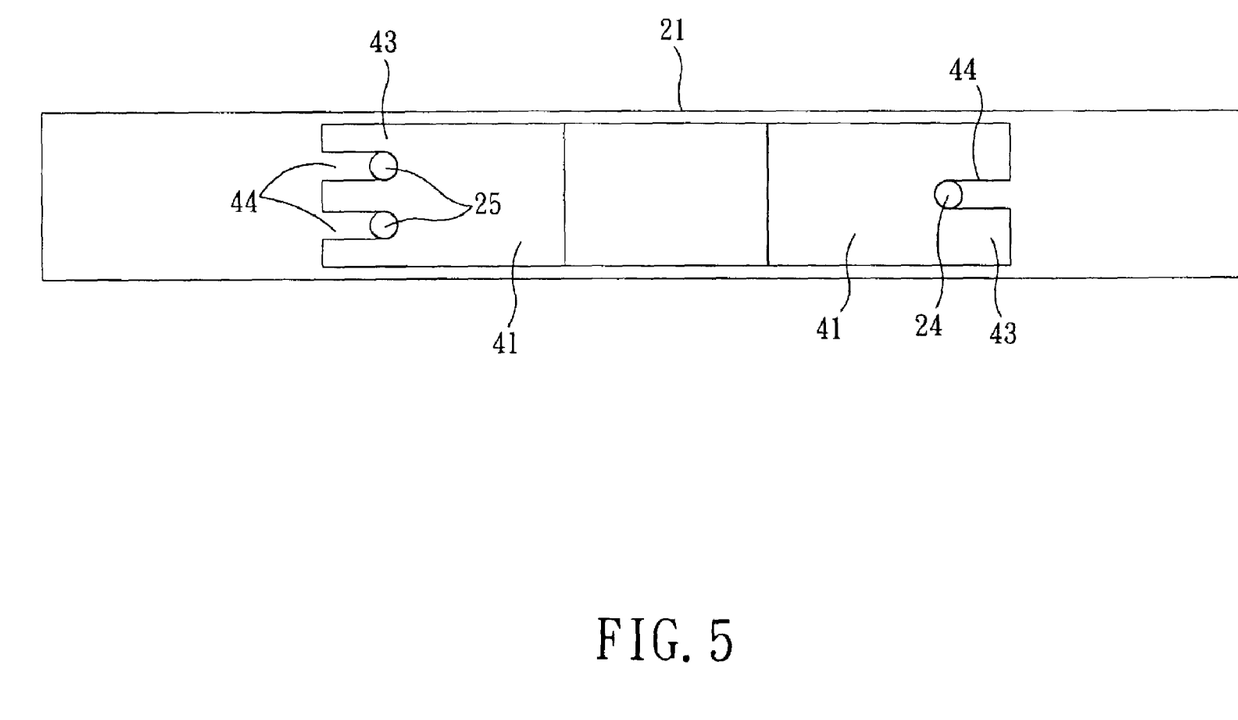
FIG. 5 shows the position of the contact image sensor after it is moved relatively.

FIG. 5 shows the position of the contact image sensor after it is moved relatively. When the contact image sensor 21 is installed between the elasticity units 41 and the glass window (not shown), the contact image sensor 21 urges the elasticity units 41.

The grooves 44 of the elasticity units 41 are opened and the protrusions 24, 25 of the contact image sensor 21 are engaged with the grooves 44. So, when the contact image sensor 21 urges the elasticity units 41, the free ends 43 move toward the two ends of the contact image sensor 21.

By this arrangement, the contact image sensor 21 can be assembled with the elasticity units 41 which generate a bounce force to urge the contact image sensor 21 onto the glass window 62.

Along with the movement of the base 31 on the guide rod 61, the elasticity units 41 and the contact image sensor 21 move along the guide rod 61 so as to scan objects.

Figure 6:
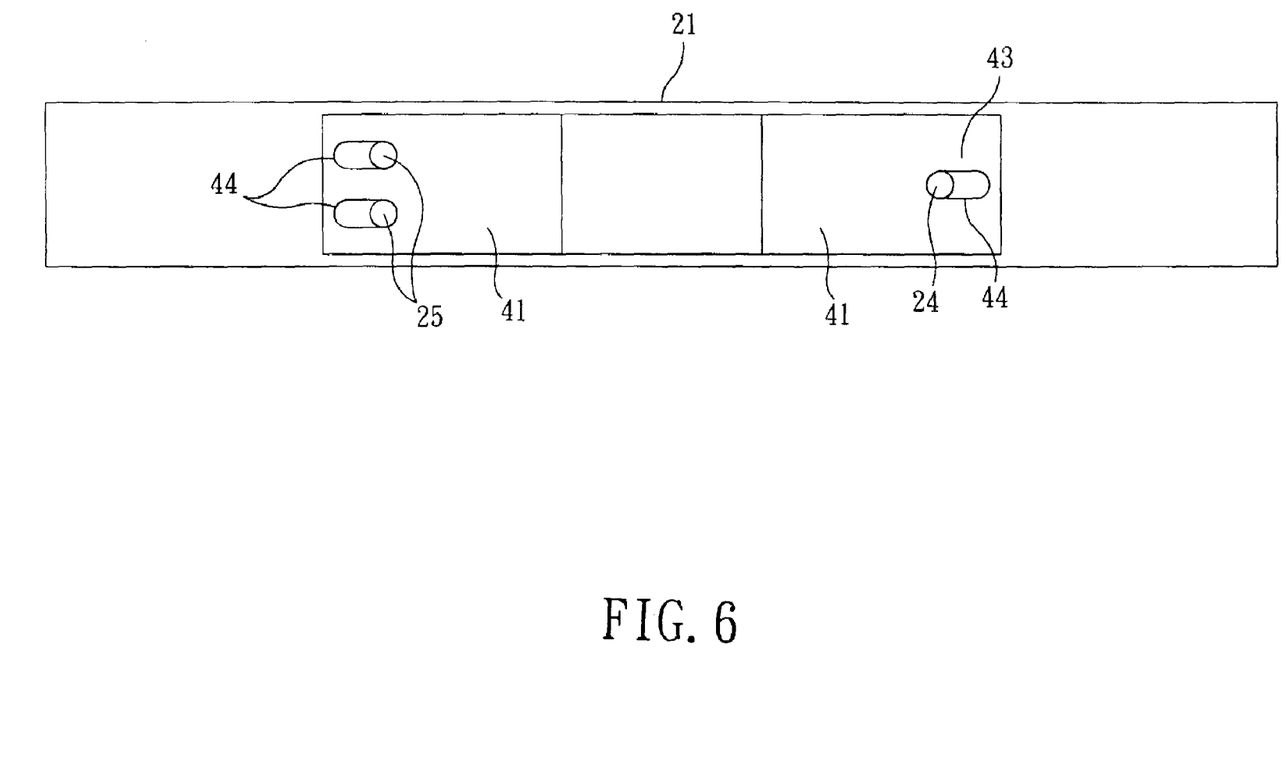
FIG. 6 is another embodiment of the present invention.

FIG. 6 is another embodiment of the present invention. The grooves 44 of the free ends 43 of the elasticity units 41 are closed. The grooves 44 are made to be elongate so that the contact image sensor 21 and the elasticity units 41 are moved relatively. The protrusions 24, 25 are able to move in the grooves 44 so that the contact image sensor 21 and the elasticity units 41 are moved relatively.

Figure 7:
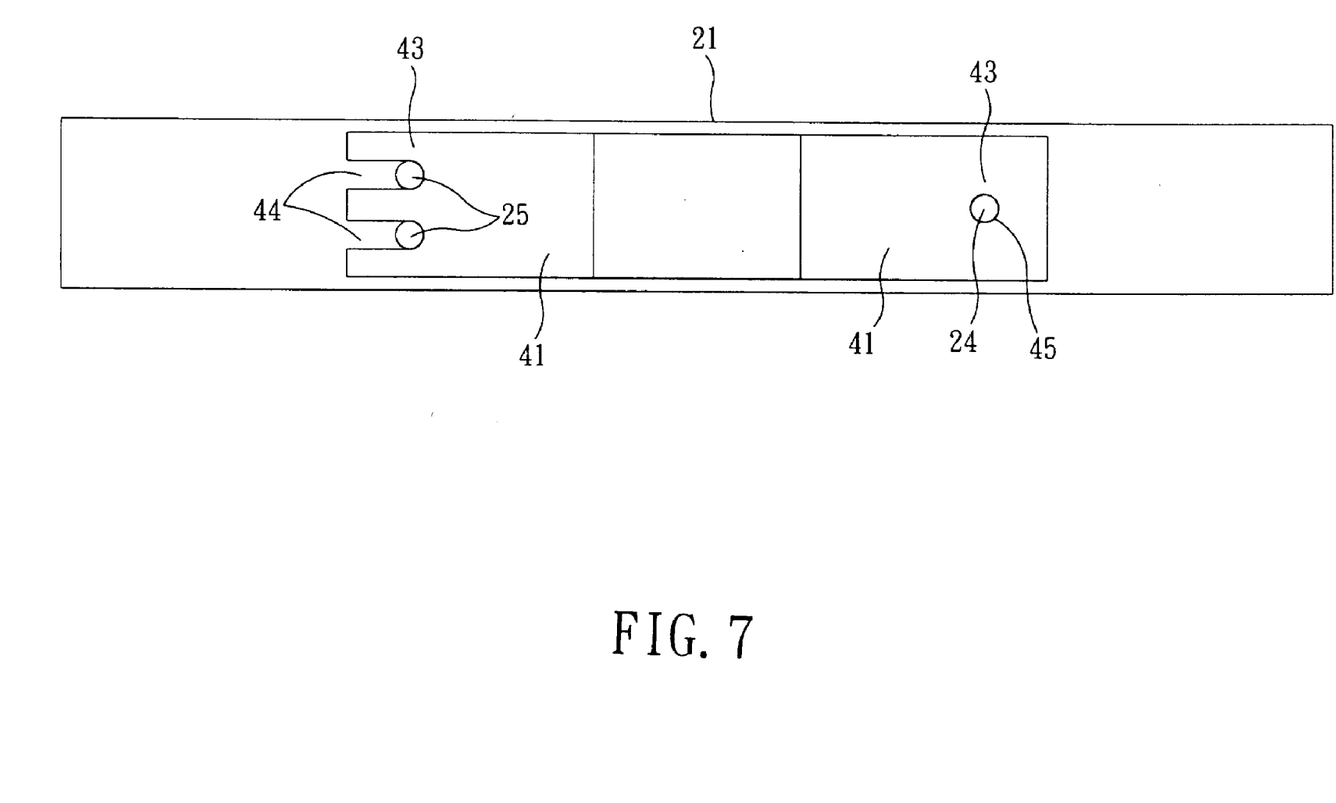
FIG. 7 is yet another embodiment of the present invention.

FIG. 7 shows yet another embodiment of the present invention wherein the free end 43 of the elasticity unit 41 as shown in the right side of the drawing has a hole 45 which is sized to receive the protrusion 24 so that when the protrusion 24 is engaged with the hole 45, the contact image sensor 21 and the elasticity units 41 are not able to move relatively.

The free end 43 of the other elasticity unit 41 as shown in the left side of the figure has two grooves 44 which has an open end and the protrusions 25 are inserted in the grooves 44.

The contact image sensor 21 and the elasticity units 41 having the grooves 44 are able to move relatively.

Figure 8:
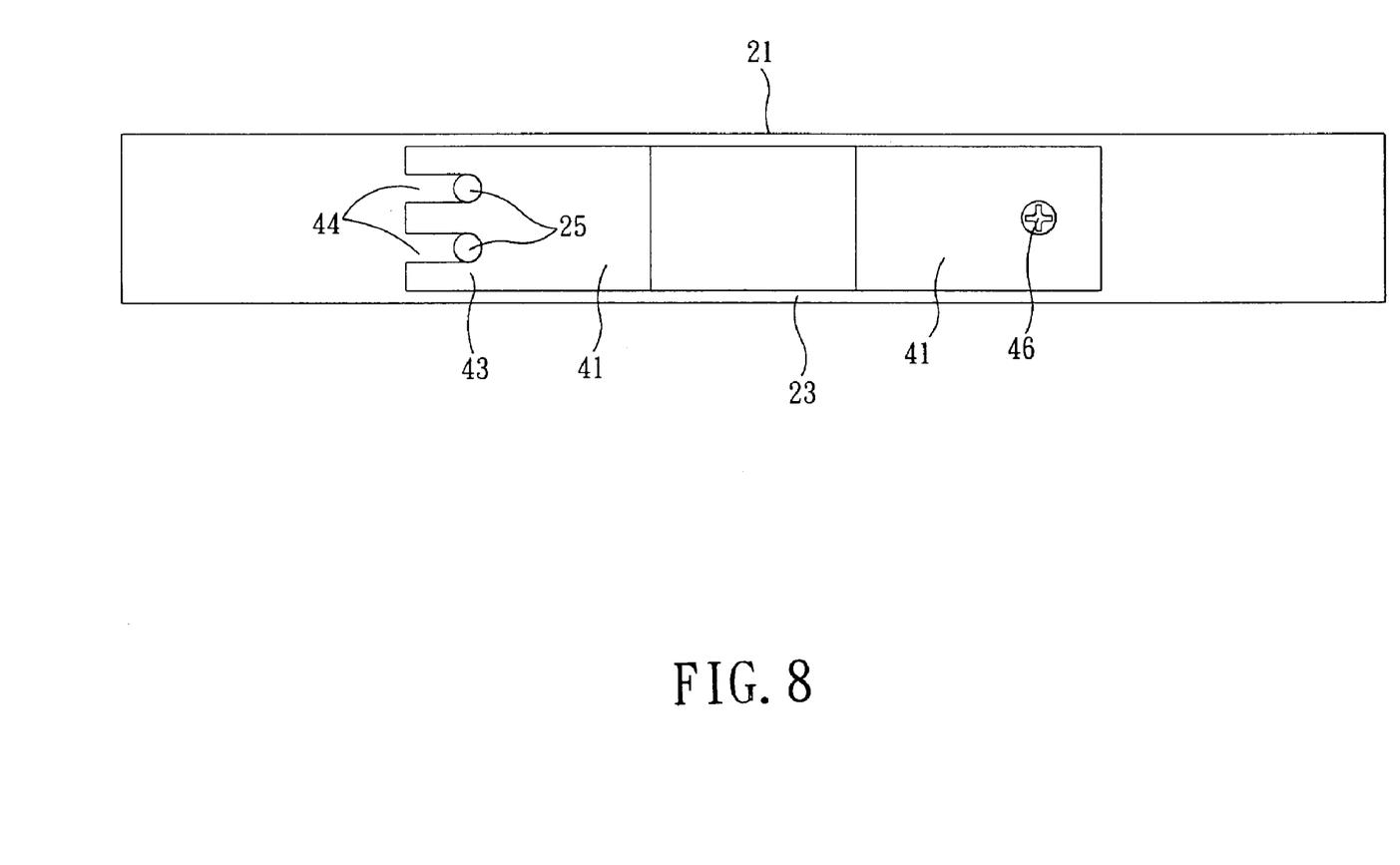
FIG. 8 shows an equivalent structure corresponding to that shown in FIG. 7.

FIG. 8 shows an equivalent structure corresponding to that shown in FIG. 7. The elasticity unit 41 on the right side is fixed to the bottom surface 23 of the contact image sensor 21 by a bolt 46 so that the contact image sensor 21 and the elasticity unit 41 do not have relative movement. The free end 43 on the left side has grooves 44 to receive the protrusions 25 of the contact image sensor 21 so that these two items are able to move relatively.

Figure 9:
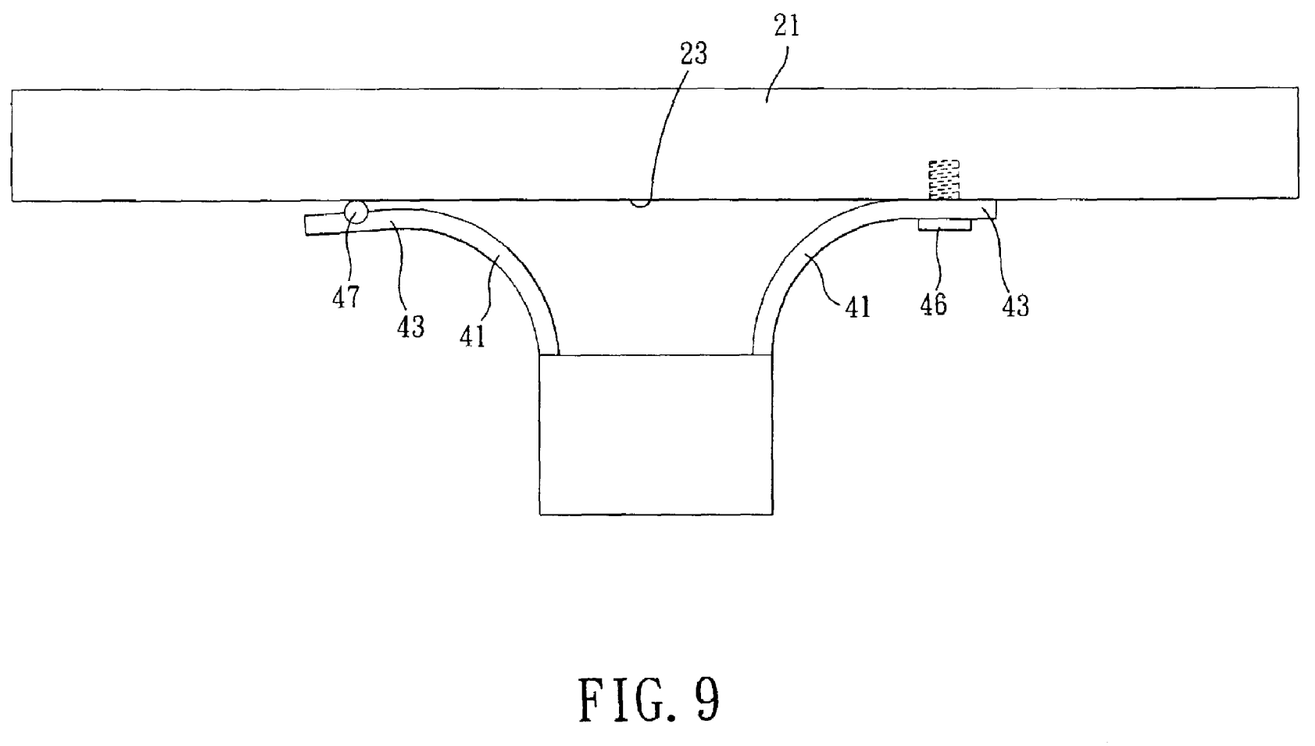
FIG. 9 shows yet another equivalent structure corresponding to that shown in FIG. 7.

FIG. 9 shows another equivalent structure corresponding to that shown in FIG. 7. The elasticity unit 41 on the right side is fixed to the bottom surface 23 of the contact image sensor 21 by a bolt 46. A bead 47 (small roller or rail) is connected between the contact image sensor 21 and the elasticity unit 41 on the left side. Therefore, the contact image sensor 21 and the free end 43 on the left side is able to move relatively.

Although there are two free ends 43 on the two elasticity units so as to evenly support the contact image sensor 21, only one free end can be made and functions the same. In this situation, the elasticity unit 41 on the left side in FIG. 9 is maintained. In order to get balance, the free end 43 of the elasticity unit 41 is preferably supported at the center of weight of the contact image sensor 21.

Figure 10:
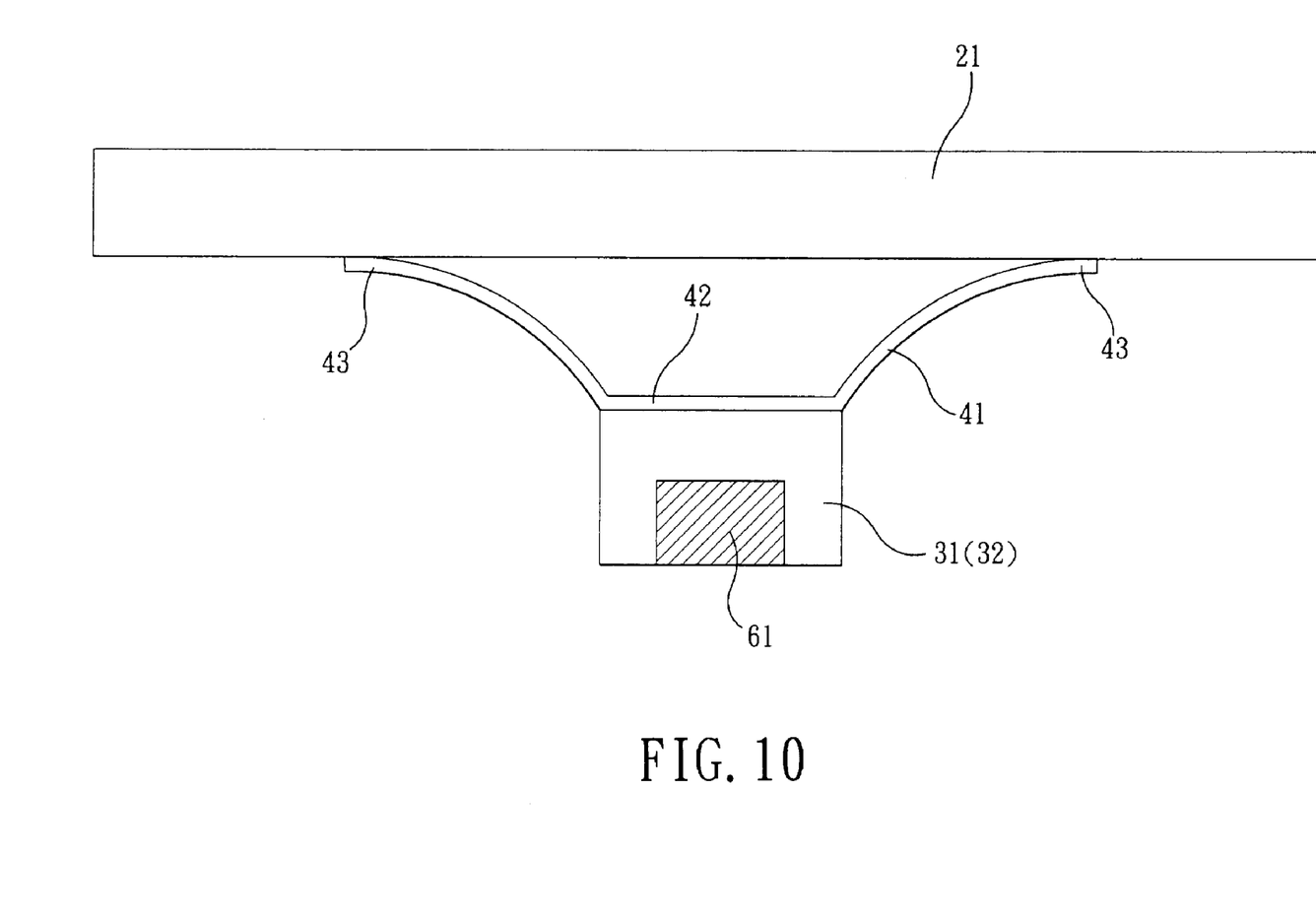
FIG. 10 is another embodiment of the present invention.

FIG. 10 shows another embodiment. In this embodiment, the contact image sensor 21 is put on the elasticity unit 41 which can be made by metal, plastic or other material and has a fixed end 42 and a free end 43. At least one free end 43 can move along the bottom surface of the contact image sensor 21. The elasticity units 41 are fixed to a base 31 which is used as a guide portion 32 to guide itself along the guide rod 61. The opening of the guide portion 32 can be any shape that engages with the shape of the guide rod 61 such as a V-shaped opening and is not limited to the rectangular opening as shown in this embodiment.

Figure 11:
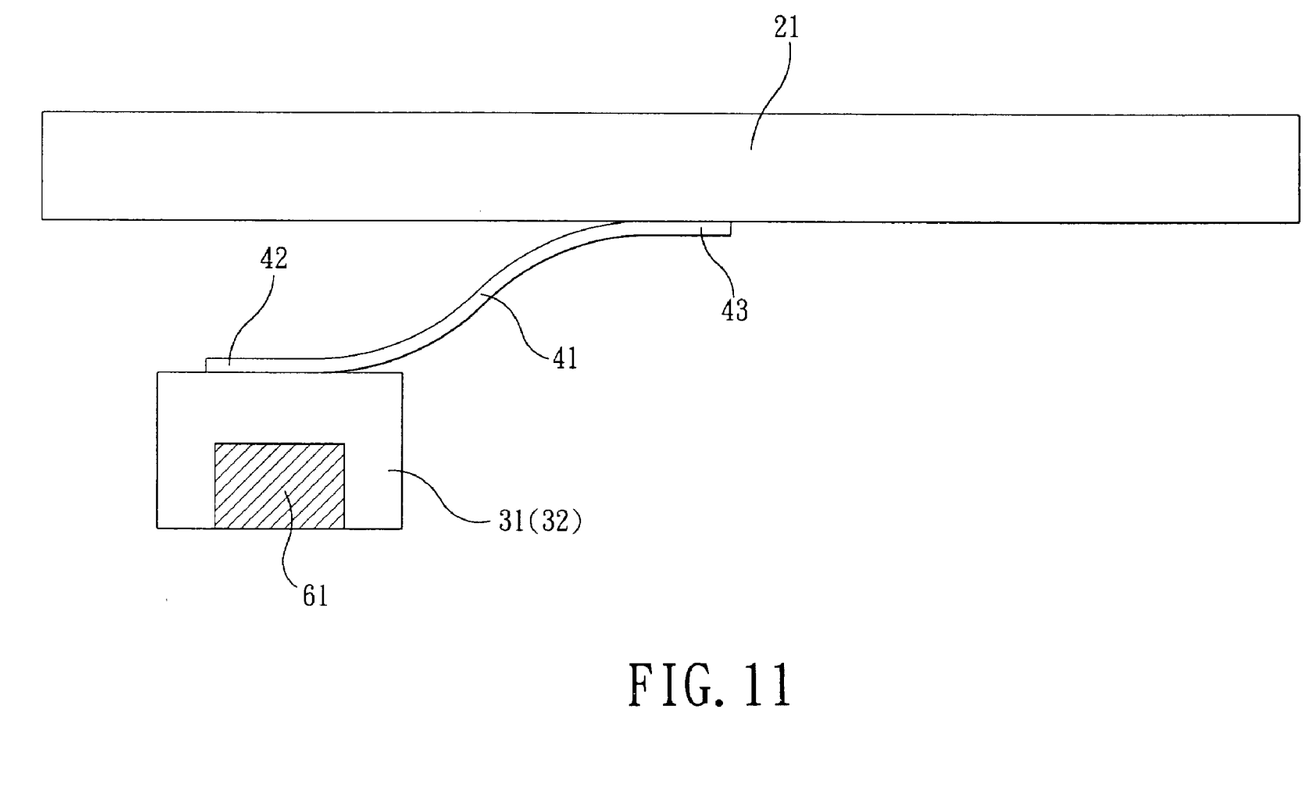
FIG. 11 is yet another embodiment of the present invention.

FIG. 11 shows yet another embodiment. In this embodiment, the contact image sensor 21 is put on an elasticity unit 41 which has a fixed end 42 and a free end 43. The free end 43 can move along the bottom surface of the contact image sensor 21. The elasticity unit 41 is fixed to a base 31 which is used as a guide portion 32 to guide itself along the guide rod 61. The opening of the guide portion 32 can be any shape that engages with the shape of the guide rod 61 such as a V-shaped opening and is not limited to the rectangular opening as shown in this embodiment.

Figure 12:
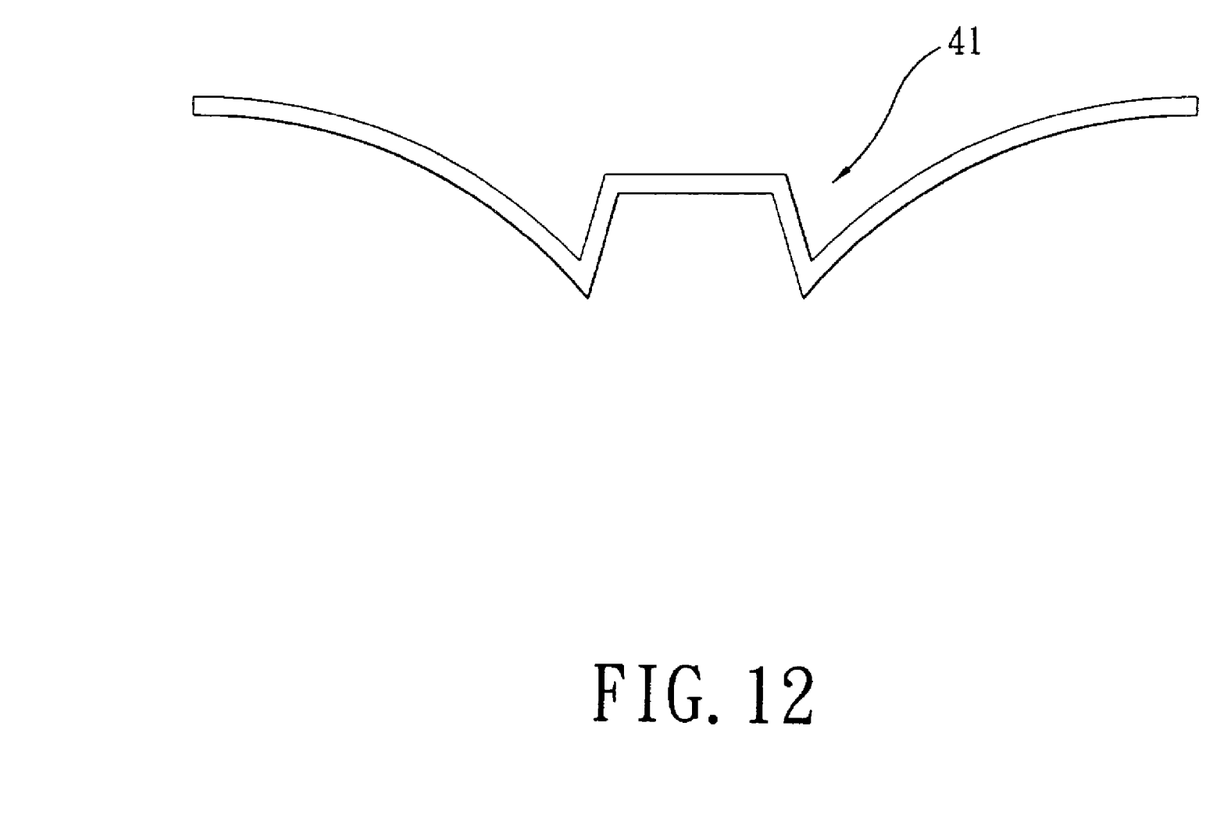
FIG. 12 shows another embodiment of the elasticity unit of the present invention.

It is to be noted that the elasticity units 41, the base 31 and the guide portion 32 can be made as a one-piece member. In this situation, cheap items can be easily made by the method of plastic ejection molding. The elasticity unit 41 as shown in FIG. 12 can also be made by bending a metal plate.

In the above mentioned embodiments, the contact image sensor 21 can be connected to the elasticity units 41 by bolts or by way of engagement, and the contact image sensor 21 can be moved relatively to at least one elasticity unit 41 so that a less friction is obtained between the contact image sensor 21 and the glass window 62. Accordingly, the present invention is easily assembled and designed, and a fixed gap is maintained between the contact image sensor 21 and the glass window 62.

The base 31 is used to let the guide rod 61 extend and the elasticity unit be fixed thereto. The area between the two sides of the base 31 to the contact image sensor 21 is not used so as to reduce the volume.

While we have shown and described the embodiments in accordance with the present invention, it should be clear to those skilled in the art that further embodiments may be made without departing from the scope of the present invention.

What is claimed is:

1. A scanning module moving along a guide rod and contacting an underside of a glass window so as to scan a document, the scanning module comprising:
    a contact image sensor for scanning the document and having a top surface and a bottom surface;
    a base, which has a first side facing the contact image sensor and a second side adjacent to the first side, moving along the guide rod; and
    an elasticity unit fixed to the first side of the base and contacting the bottom surface of the contact image sensor, wherein the elasticity unit and the contact image sensor are moveable relative to each other, wherein the contact image sensor and the elasticity unit are connected with each other by engagement of protrusions and grooves.

2. The scanning module as claimed in claim 1, wherein the elasticity unit has a fixed end and a free end, the fixed end is fixed to the base and the free end is located away from the base and contacts the bottom surface of the contact image sensor, and the free end and the contact image sensor are moveable relative to each other.

3. The scanning module as claimed in claim 1, wherein there are two elasticity units each fixed to the first side of the base and contacting the bottom surface of the contact image sensor, each of the elasticity units having a fixed end and a free end, the fixed ends being fixed to the base and the free ends being located away from the base, at least one of the free ends and the contact image sensor are moveable relative to each other.

4. The scanning module as claimed in claim 1, wherein the top surface of the contact image sensor has two slidable units which contact the glass window.

5. The scanning module as claimed in claim 1, wherein at least one groove has an open end.

6. The scanning module as claimed in claim 1, wherein at least one groove has a close end.

7. The scanning module as claimed in claim 1, wherein the elasticity unit and the base are made as a one-piece member.

8. A scanning module moving along a guide rod and contacting an underside of a glass window so as to scan a document, the scanning module comprising:
    a contact image sensor for scanning the document and having a top surface and a bottom surface;
    a base, which has a first side facing the contact image sensor and a second side adjacent to the first side, moving along the guide rod; and
    an elasticity unit fixed to the second side of the base and contacting the bottom surface of the contact image sensor, wherein the elasticity unit and the contact image sensor are moveable relative to each other wherein the contact image sensor and the elasticity unit are connected with each other by engagement of protrusions and grooves.

9. The scanning module as claimed in claim 8, wherein the elasticity unit has a fixed end and a free end, the fixed end is fixed to the base and the free end is located away from the base and contacts the bottom surface of the contact image sensor, and the free end and the contact image sensor are moveable relative to each other.

10. The scanning module as claimed in claim 8, wherein there are two elasticity units each fixed to the first side of the base and contacting the bottom surface of the contact image sensor, each of the elasticity units having a fixed end and a free end, the fixed ends being fixed to the base and the free ends being located away from the base, at least one of the free ends and the contact image sensor are moveable relative to each other.

11. The scanning module as claimed in claim 8, wherein the top surface of the contact image sensor has two slidable units which contact the glass window.

12. The scanning module as claimed in claim 8, wherein at least one groove has a open end.

13. The scanning module as claimed in claim 8, wherein at least one groove has a close end.

14. The scanning module as claimed in claim 8, wherein the elasticity unit and the base are made as a one-piece member.

15. The scanning module as claimed in claim 8, wherein the elasticity unit extends from the second side of the base.

* * * * *